US011153318B2

(12) United States Patent
Gordon et al.

(10) Patent No.: US 11,153,318 B2
(45) Date of Patent: Oct. 19, 2021

(54) ALTERING DEVICE BEHAVIOR WITH LIMITED PURPOSE ACCOUNTS

(71) Applicant: MICROSOFT TECHNOLOGY LICENSING, LLC, Redmond, WA (US)

(72) Inventors: Ariel Gordon, Mercer Island, WA (US); Kristina Karen Hotz, Seattle, WA (US); Jesus Ferrer Labayen, Winchester, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 234 days.

(21) Appl. No.: 16/200,186

(22) Filed: Nov. 26, 2018

(65) Prior Publication Data

US 2020/0169558 A1 May 28, 2020

(51) Int. Cl.
*H04L 29/06* (2006.01)
*G06F 21/62* (2013.01)

(52) U.S. Cl.
CPC .......... *H04L 63/101* (2013.01); *G06F 21/629* (2013.01)

(58) Field of Classification Search
CPC . H04L 63/101; G06F 21/629; G06F 21/6281; G06F 21/45
See application file for complete search history.

(56) References Cited

U.S. PATENT DOCUMENTS

| | | | | |
|---|---|---|---|---|
| 9,602,540 B1 * | 3/2017 | Johansson | ............... | H04L 63/08 |
| 10,026,078 B1 * | 7/2018 | Nolan | ............... | G06Q 20/3572 |
| 2002/0130834 A1 * | 9/2002 | Madarasz | ............. | H04L 69/329 |
| | | | | 345/156 |
| 2008/0216171 A1 * | 9/2008 | Sano | ................... | H04W 12/082 |
| | | | | 726/19 |
| 2010/0031348 A1 | 2/2010 | Lam et al. | | |
| 2011/0078787 A1 | 3/2011 | Hamid | | |
| 2012/0253852 A1 * | 10/2012 | Pourfallah | ........... | G06Q 20/405 |
| | | | | 705/4 |
| 2013/0229582 A1 * | 9/2013 | Du | ....................... | H04N 5/4403 |
| | | | | 348/734 |
| 2016/0357950 A1 * | 12/2016 | Martel | ................ | G06F 21/6281 |
| 2018/0367617 A1 * | 12/2018 | Moustafa | .............. | H04L 67/125 |
| 2019/0034621 A1 * | 1/2019 | Mondello | ............. | H04L 63/083 |
| 2019/0244203 A1 * | 8/2019 | Phillips | .............. | G06Q 30/0215 |

FOREIGN PATENT DOCUMENTS

WO      2018059025 A1      4/2018

OTHER PUBLICATIONS

"International Search Report and Written Opinion Issued in PCT Application No. PCT/US2019/061333", dated Feb. 25, 2020, 11 Pages.

* cited by examiner

*Primary Examiner* — Meng Li
(74) *Attorney, Agent, or Firm* — Rainier Patents, P.S.

(57) ABSTRACT

A limited purpose account can be provided to a legitimate user to avoid some types of anti-abuse mechanisms from being triggered when the user connects to an identity verifier using a username known to belong to a limited purpose account. A limited purpose account is an account in which certain privileges of ordinary use are disabled or curtailed. A limited purpose account may be an account that can only be used with a limited number of applications or for a limited amount of time, thus reducing the ability of the limited purpose user to gain unauthorized access to resources. The operating system can reset itself to a previous state when the account is disconnected or when the device is turned off.

20 Claims, 5 Drawing Sheets

ALTERING DEVICE BEHAVIOR WITH LIMITED PURPOSE ACCOUNTS

BACKGROUND

The importance of cyber security continues to increase as the use of computers continues to grow. Cyber security encompasses all aspects of protection of computer systems including theft of and damage to resources such as hardware, software, data and so on. Computer systems, and especially computer systems that provide services over public networks, can be the target of various attacks in which attempts to obtain unauthorized access to resources are made.

To combat cyberattacks, various anti-abuse techniques are used. For example, one known technique, called throttling, is an anti-abuse methodology that slows down or denies a user's access to a resource in response to determining that the user is or has a high likelihood of being unauthorized to access the resource. Another way to combat cyberattacks is to use an identity verification methodology that provides automatic login and password management through creation of identity accounts.

SUMMARY

A limited purpose account can alter the behavior of a computing device that the limited purpose account is used with. One typical use would be to alter the first-run or "Out of Box Experience" when a limited purpose account is used to set up a device. Altered behavior can include restricting the device capability, restricting what the device can do online, preventing certain anti-abuse mechanisms from being triggered, and allowing the device to reset itself to a previous state when the account is disconnected or when the device is turned off. When a legitimate user or organization enters on the computing device a username known to belong to a limited purpose account, certain privileges of ordinary user accounts can be disabled. A limited purpose account may restrict the number of applications that can be used, the features of the applications or the amount of time the applications can be used for, thus reducing the ability of the user to use the device, account and applications for malicious purposes or to gain unauthorized access to resources.

In response to determining that the username provided when connecting to an identity verifier belongs to a limited purpose account, some anti-abuse mechanisms can be disabled or altered. In response to determining that the provided username is associated with a limited purpose account, conditional access rules can be used to restrict how the account is used. A limited purpose account may be issued to any user or organization who has a legitimate reason to perform actions that ordinarily would trigger anti-abuse mechanisms. One such user is a user or organization who tests computing device hardware such as an OEM (original equipment manufacturer) although other types of users of limited purpose accounts are contemplated.

Certain usernames can be designated as belonging to a limited purpose account. When a request from a user or organization using a username for a limited purpose account is received at an identity verifier, some of the privileges of a traditional user can be disabled or limited. For example, a limited purpose account may be unable to retrieve files (e.g., backup files in the cloud), to send email, to start audio or video calls, etc.

In response to detecting the connection of a limited purpose account to an identity verifier, the identity verifier can alter the anti-abuse logic applied to the device. For example, typical anti-abuse logic may deny a user access to a resource if a threshold number of access requests are made within a specified period of time from the same IP address or range of IP addresses. This type of anti-abuse mechanism is called throttling. For a limited purpose account, the thresholds may be altered or the throttling logic may be disabled. An IP address (Internet Protocol address) is a numerical identifier assigned to a device connected to a computer network where the network uses the Internet Protocol for communication.

In response to determining that the user account is a limited purpose account, the operating system of the device it is used on can automatically shut down the device from which the request was received after a configurable or specifiable period of time. The operating system of the device, in response to detecting that a limited purpose account was used, can reset itself to a previous state such as to original factory settings before the device is shut down.

Often, the string that is used for an account username is an email address. One way to designate limited purpose accounts is to designate a domain name or a plurality of domain names that indicate that the account connected to a device is a limited purpose account. The limited purpose account holder can provide a list of limited purpose account usernames or domain names to the identity verifier. Similarly, the identity verifier can provide a list of limited purpose account usernames or domain names to the limited purpose account holder.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

When a user purchases a computing device and turns it on for the first time, the user experiences what is referred to as "first run" or "Out of Box Experience" behavior. Typically the user is asked for information such as the region, the desired language and so on. The user is asked to connect his identity account. The identity account is used to verify that the user is legitimate (e.g., not a hacker, scammer, spammer, illegitimate user, malicious actor, etc.). The identity account may also be used to copy over data and settings that the user had on a previous device. This first run logic is executed only the first time the device is turned on.

Today, when a computing device is manufactured, typically the device manufacturer will remove a number of devices from the assembly line to test that the hardware is operating properly. Hardware tests can include such things as testing the radio on a smart phone, checking the wifi component, making sure the screen is working correctly, and so on, as is well-known in the art. The first time a computing device is turned on, logic in the operating system of the device typically detects that this is the first time the device has been turned on and executes first run logic. First run logic can include selecting a region, selecting a language, connecting to the Internet, accepting terms of service, selecting a keyboard layout, creating an identity account for or connecting the identity account to the device and so on. The next time the device is turned on, the device will detect that it has already been turned on and will not execute the first run logic.

When a computing device is tested (e.g., at the factory, etc.), the tester experiences the first run logic. The next time the device is turned on (e.g., by an end user of the device) the first run logic will not execute. To overcome this, traditionally the computing device is re-imaged, that is, the device is returned to the assembly line (whether directly by the tester or indirectly) and the operating system of the device is re-initialized (set back to factory default settings) by "re-imaging the disk". Re-imaging means overwriting the existing operating system which may have been changed because of user first run input, with the original (factory default or other) operating system software.

Similarly, software developers also find it necessary to re-image the device during operating system development and testing. Typically a software developer runs a set of tests, re-images the device and runs another set of tests. Another case in which the device needs to be re-imaged is when running a demo.

Today, when software or hardware tests are run on a computing device (e.g., at a factory, in a software development scenario or elsewhere), as much as possible of the first run logic (such as but not limited to connecting the device to an identity account) is typically bypassed because it increases the time it takes to test the device and is irrelevant as connecting an identity account to the device is typically not necessary for testing. Connecting the device to an identity account is helpful for a user of the computing device for a number of reasons. For example, when a user is replacing a previous device, restoring from a backup is an easy way to set the new device to be a clone of the previous device because most of the settings associated with the previous device are stored in the cloud attached to the identity account. The process of restoring from a backup is sometimes referred to as "rehydrating" the services, applications and data so that for example, the pictures, the favorites, the downloaded applications etc. of a previous device (e.g., a smart phone) are placed on a new device (on the new smart phone). In certain limited purpose modes, such as, for example, testing mode, or when a demo is presented, rehydration is not useful. Instead a local account can be used to "reach the desktop" as quickly as possible. "Reaching the desktop" means getting to the home screen of the computing device where, for example, hardware testing can be performed.

There may, however, be instances in which bypassing connection to an identity account is not desired. In accordance with aspects of the subject matter described herein, a limited purpose, (e.g., test mode, demo mode) is enabled in which the operating system of the device recognizes a limited purpose account is being connected in which case, the device is run in limited purpose mode, which triggers a system reset back to the initial operating system image when the computing device is turned off. This means that the next time the device is turned on, a user experiences the first run logic without a need to re-image the device.

Current anti-abuse mechanisms can limit the number of identity accounts created or used from a single IP address or range of IP addresses. This is done to block malicious or unauthorized actors who may create or use a large number of accounts in an attempt to gain unauthorized access to resources. Typically, when a large number (where what is considered "large number" is defined as a number exceeding a specifiable number of accounts created or used from an IP address or range of IP addresses within a specifiable period of time) of accounts are created or used in a specified period of time, anti-abuse mechanisms prevent or curtail access to resources. Known anti-abuse mechanisms are unable to distinguish between an unauthorized or illegitimate user and a legitimate user such as for one example, a tester who creates or uses a large number of accounts to test hardware. In accordance with aspects of the subject matter described herein, a legitimate user is distinguished from an unauthorized user by having a limited purpose account. When a limited purpose account is detected at the identity verifier, one or more anti-abuse mechanism can be altered or disabled, and certain traditional user functionalities can be disabled or altered.

Altering Device Behavior with Limited Purpose Accounts

Figure 1:
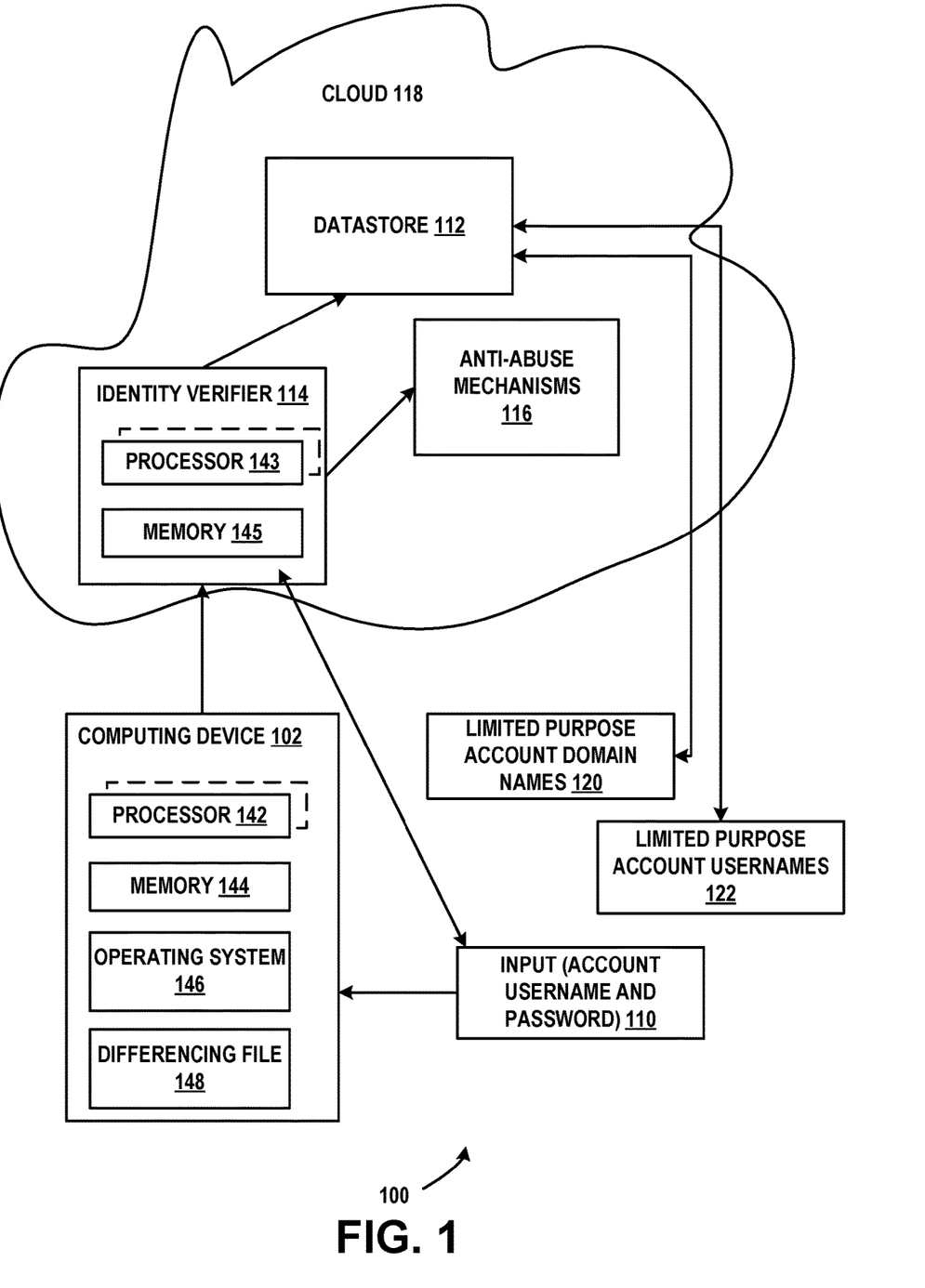
FIG. 1 is a block diagram 100 representing an example of a system for creating and using limited purpose accounts in accordance with aspects of the subject matter disclosed herein.

FIG. 1 is a block diagram representing an example of a system 100 for creating and using limited purpose accounts in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in. System 100 or portions thereof may execute wholly or partially in an IDE (integrated development system). System 100 or portions thereof may include information obtained from a service (e.g., in the cloud) or may operate in a cloud computing environment represented in FIG. 1 by cloud 118. Cloud computing enables access to shared pools of configurable system resources. It can also provide various services that can be set up rapidly with little effort. Sharing of resources can provide economies of scale.

Cloud computing enables an entity to focus on its actual business instead of having to provide its own computer infrastructure and maintenance. A cloud computing environment can be an environment in which computing services are not owned but are provided on demand. For example, information may reside on multiple devices in a networked cloud and/or data can be stored on multiple devices within the cloud. Cloud providers typically use a "pay-as-you-go" paradigm. In accordance with aspects of the subject matter disclosed herein, operating in a cloud computing environment provides the advantage of access to an identity verifier that triggers anti-abuse mechanisms in response to determining that the user of an account is illegitimate or unauthorized. In accordance with aspects of the subject matter described herein, conditional access rules can be applied to a device connected to a limited purpose account. In accordance with aspects of the subject matter described herein, anti-abuse mechanisms can be altered or disabled for a device connected to a limited purpose account.

Figure 3:
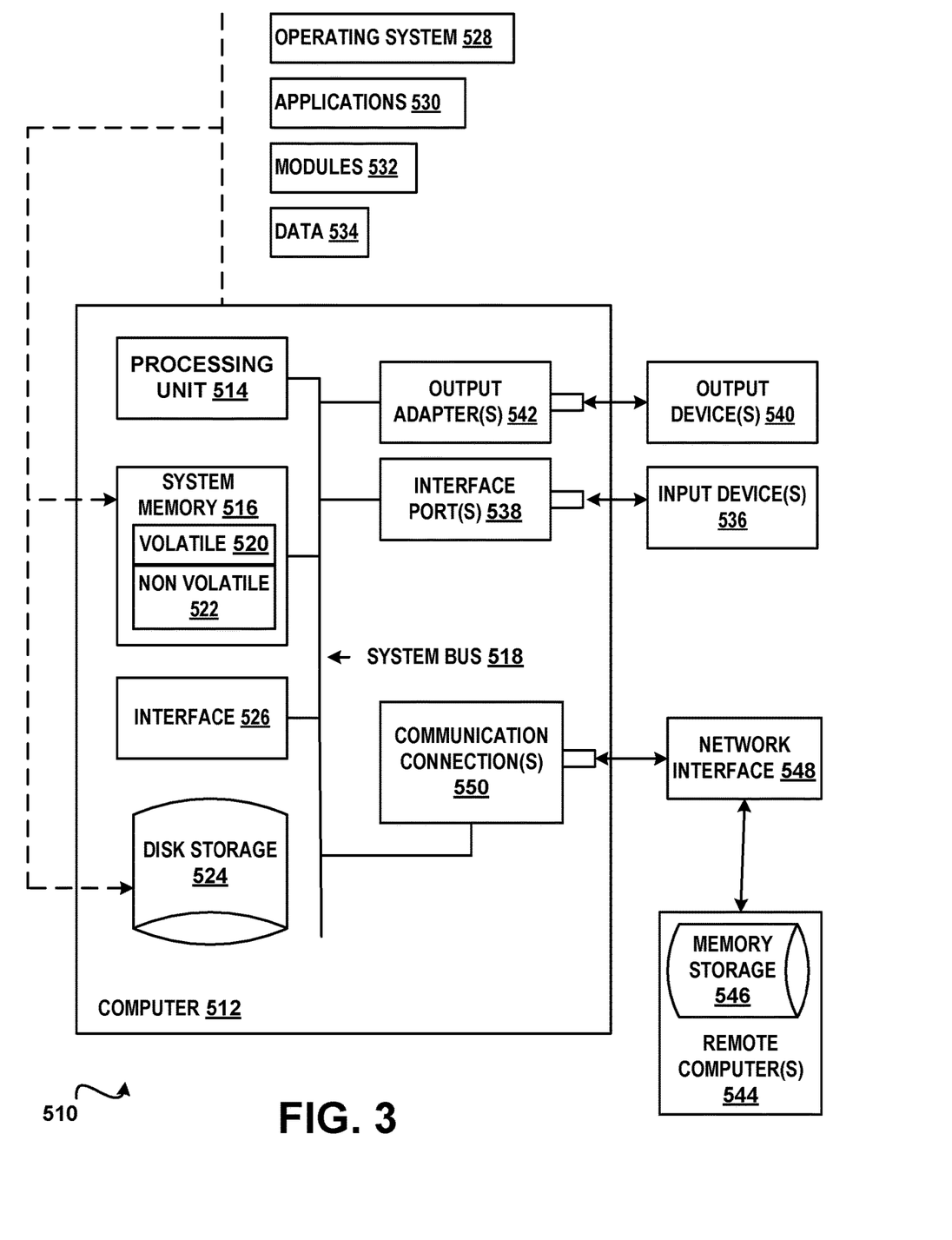
FIG. 3 is a block diagram of an example of a computing environment in accordance with aspects of the subject matter described herein.

System 100 can include one or more computing devices as described more fully in FIG. 3, comprising a limited purpose account system. Contemplated computing devices include but are not limited to e-readers, smart televisions, game consoles, desktop computers, tablet computers, laptop computers, notebook computers, personal digital assistants, smart phones, tablets, cellular telephones, mobile telephones, servers, virtual machines, devices including databases, firewalls and any connected device. System 100 or portions thereof can operate in the cloud or in a networking environment.

System 100 can be a limited purpose account system and may include one or more program modules running on one or more computers which when loaded into the memory and accessed by the one or more processors configure the processor or processors to perform the actions attributed to the one or more program modules. A limited purpose account system can include an identity verification system represented in FIG. 1 by identity verifier 114 that verifies the identity of a limited purpose account connected to a computing device 102. The identity verifier can comprise one or more computing devices, each comprising a memory such as memory 145 and one or more processors such as processor 143, etc. connected to the memory 145. The identity verification system can provide automatic login and password management through creation of identity accounts. The limited purpose account system can include an anti-abuse system represented in FIG. 1 by anti-abuse mechanisms 116, that can apply altered anti-abuse mechanisms to limited purpose accounts. The limited purpose account system can include a datastore represented in FIG. 1 by datastore 112. The datastore can include domain names for limited purpose accounts, and/or lists of limited use account names.

The datastore 112 can store limited purpose domain names 120 which are domain names that are dedicated to limited purpose accounts. The datastore 112 can store usernames 122 that are dedicated to limited purpose accounts. The usernames that are dedicated to limited purpose accounts can be provided by the user or organization using the limited purpose accounts. The lists of usernames can be provided by the identity verifier 114 to the user or organization. Similarly, the domain name or names can be provided to the identify verifier 114 by the user or organization or can be provided by the identify verifier 114 to the user or organization.

The limited purpose account system can include a computing device such as computing device 102. Computing device 102 can include one or more processors such as processor 142, etc., and a memory such as memory 144 that communicates with the one or more processors. Computing device 102 can include an operating system such as operating system 146. Operating system 146 can connect an identity account to the device. Operating system 146 can connect to an identity verification system such as identity verifier 114 and can receive a notification from the identity verification system that the account connected to the computing device 102 is a limited purpose account. In response operating system 146 can set itself into a limited purpose mode that restricts the number of applications the device can run. Running in limited purpose mode can restrict the amount of time the device can run until automatic shutdown by the operating system. Running in limited purpose mode can cause changes to the way first run processing is performed so that changes made during and after first run processing are written to a separate file such as differencing file 148 instead of changing the operating system 146. The differencing file 148 can be automatically deleted by the operating system 146 when the device is automatically shut down.

Figure 2A:
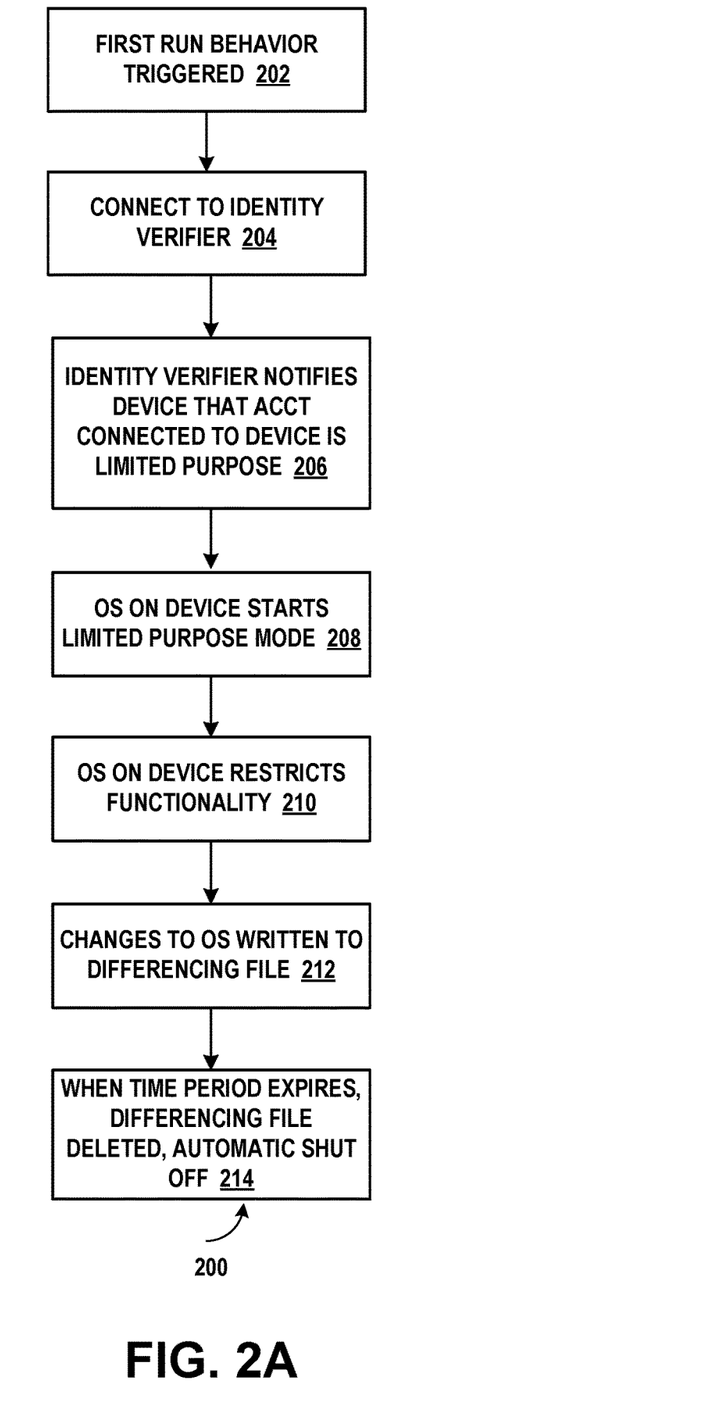
FIG. 2A illustrates an example of a method 200 for processing a limited purpose account in accordance with aspects of the subject matter described herein in accordance with aspects of the subject matter disclosed herein.

FIG. 2A illustrates an example of a method 200 for processing limited purpose accounts in accordance with aspect of the subject matter disclosed herein. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated. Method 200 or portions thereof may be executed by a system or a portion of a system such as system 100.

At operation 202 a computing device such as computing device 102 can be turned on for the first time, thereby triggering first run logic. At operation 204 a user can be prompted to connect to the identity verification system (identity verifier) The identity verification system can render a user interface that collects a username and password 110. The computing device can connect to the identity verification system. The identity verification system can determine that the username is associated with a limited purpose account. The identity verification system can determine that the username is associated with a limited purpose account by comparing the username with a domain name dedicated to limited purpose accounts. In response to determining that the username is associated with a limited purpose account, the identity verification system can notify the anti-abuse system that conditional use rules are to be applied which alter or disable some anti-abuse mechanisms. Alternatively, the identity verification system can determine that the username is associated with a limited purpose account by determining that the username is included in a list of limited purpose usernames. The list of limited purpose usernames or domain names can be provided to the identity verification system by the user. The list of limited purpose usernames or domain names can be provided by the identity verification system to the user.

At operation 206, the device can receive a notification from the identity verification system that the account is a limited purpose account. At operation 208, in response to receiving a notification from the identity verification system that the account to which the device is connected is a limited purpose account, the operating system can execute limited purpose first run logic. The operating system on the device can set itself into a limited purpose mode (e.g., testing mode). At operation 210 the operating system can restrict functionality available to the account as described more fully above. At operation 212 any changes to operating system settings can be written to a differencing file. At operation 214 after a configurable or specifiable time period, the operating system can erase the differencing file and turn the device off (automatically, without any user input requesting the shut off). This has the effect of returning the computing device to its original setting (e.g., factory default settings, etc.) so that the next time the device is turned on, first run logic is performed.

Figure 2B:
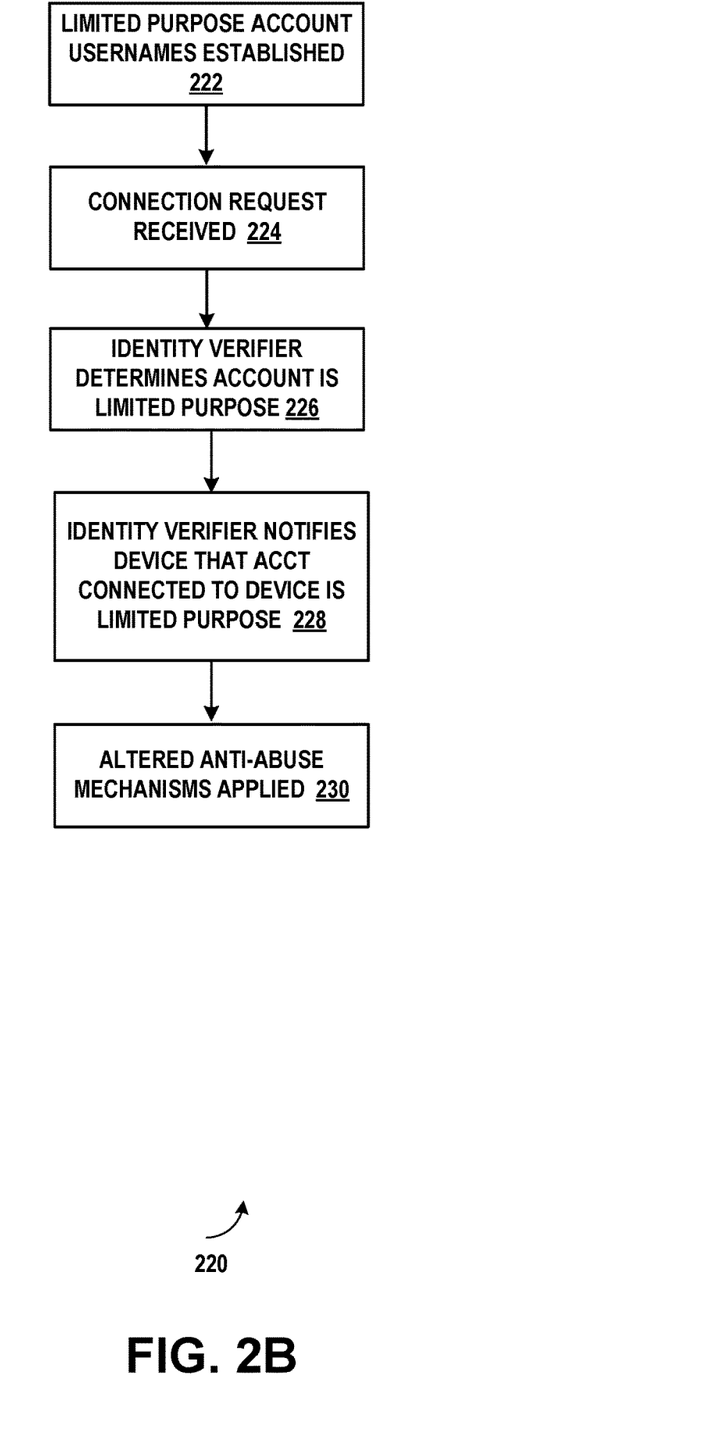
FIG. 2B illustrates an example of a method 220 for determining if an account connected to a computing device is a limited purpose account and processing the limited purpose account in accordance with aspects of the subject matter described herein.

FIG. 2B illustrates an example of a method 220 comprising identification and processing of a limited purpose account by the identity verification system in accordance with aspects of the subject matter disclosed herein. While method 220 describes a series of operations that are performed in a sequence, it is to be understood that method 220 is not limited by the order of the sequence depicted. For instance, some operations may occur in a different order than that described. In addition, one operation may occur concurrently with another operation. In some instances, not all operations described are performed. In some instances, not all operations performed are illustrated. Method 220 or portions thereof may be executed by a system or a portion of a system such as system 100.

At operation 222 an identity verification system (identity verifier) may establish usernames associated with limited purpose accounts. The identity verification system can receive a list of usernames comprising limited purpose account usernames from a user or organization. An identity verification system may provide a list of usernames comprising limited purpose account usernames to a user or organization. An administrator of an identity verification system may establish one or more domain names dedicated to limited purpose accounts. A user or organization can establish one or more domain names dedicated to limited purpose accounts. A username that includes the domain name is understood to be a username for a limited purpose account. The usernames can be stored in a datastore which can be accessed by the identity verifier.

At operation 224 an identity verification system (identity verifier) can receive a request to connect from a computing device. At operation 226 the verification system can identify the device to be connected to be a limited purpose account. One way the verification system can determine that the device is connected to a limited purpose account is to check to see if the username received is in a datastore of limited purpose account usernames. Similarly, if the domain name of the username is designated as a domain name dedicated to limited purpose accounts, the verification system can identity the device to be connected to a limited purpose account. At operation 228 the identity verifier can notify the device from whom the request was received that the account is a limited purpose account. At operation 230 altered anti-abuse mechanisms can be applied to the limited purpose account. This has the effect of permitting the limited purpose account user to perform activities that would ordinarily be prevented by the anti-abuse mechanisms.

Figure 2C:
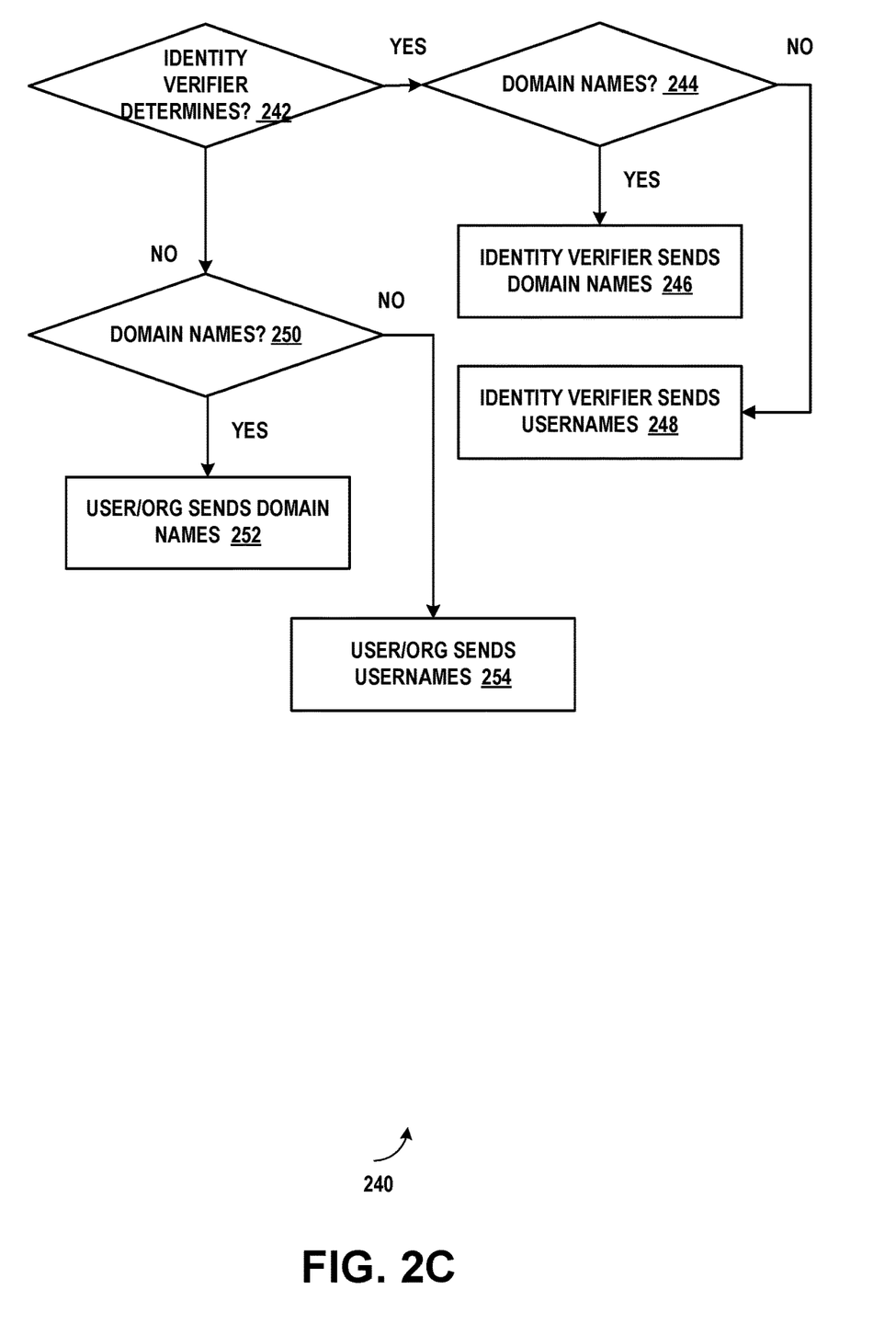
FIG. 2C illustrates an example of a method 240 for establishing usernames for limited purpose accounts in accordance with aspects of the subject matter described herein.

FIG. 2C illustrates an example of a method 240 establishing one or more domain names or usernames that identify limited purpose accounts in accordance with aspects of the subject matter disclosed herein. While method 240 describes a series of operations that are performed in a sequence, it is to be understood that method 240 is not limited by the order of the sequence depicted. For instance, some operations may occur in a different order than that described. In addition, one operation may occur concurrently with another operation. In some instances, not all operations described are performed. In some instances, not all operations performed are illustrated. Method 240 or portions thereof may be executed by a system or a portion of a system such as system 100.

At operation 242 in response to determining that an identity verifier establishes account identifiers associated with limited purpose accounts processing continues at operation 244. At operation 244, in response to determining that the account identifiers are identified by including one or more domains to which the username belongs, the identity verifier sends the user or organization one or more domain names at operation 246. In response to determining that account identifiers are not identified by domain names at operation 244, the identity verifier can send one or more usernames dedicated to limited purpose accounts to a user or organization at operation 248. At operation 242 in response to determining that an identity verifier does not establish account identifiers, processing can continue at operation 250. At operation 250 in response to determining that the account identifiers are identified by including one or more domains to which the username belongs the user or organization can send one or more domain names to the identity verifier at 252. At operation 250 in response to determining that the account identifiers are not identified by domain names, the user or organization can send one or more usernames to the identity verifier at operation 254.

Described herein is a computing device for enabling limited purpose accounts, the computing device comprising an operating system for processing limited purpose accounts loaded into a memory, the memory connected to a processor, the processor configured to send a request for connection to an identity verifier, the request comprising a username associated with a limited purpose account, the limited purpose account comprising an account for which anti-abuse logic applied to the account is altered; and in response to receiving a notification from the identity verifier indicating the account is a limited purpose account, automatically shutting down the computing device when a configurable period of time has elapsed. Limited purpose account usernames can be provided to the identity verifier by a user of the computing device. The user can be a manufacturer of the computing device. Limited purpose account usernames can be determined by inclusion of a limited purpose domain name in the username maintained by the identify verifier. Changes to settings of the operating system are not made to the operating system during first run logic. The operating system maintains a separate file in which changes to initial settings of the operating system during a first run are stored. The operating system deletes the separate file upon automatic shutdown of the device by the operating system. User functionality is restricted such as by restricting the user from one of downloading or uploading files and sending email or restricting how many applications that can be used, features of the applications and amount of time the applications can be used for.

Described herein is a computing device comprising an identity verifier comprising a memory and a processor connected to the memory, the processor configured to receive a request for connection from a device connected to a limited purpose account; and in response to determining that the request comprises a limited purpose username, altering anti-abuse logic applied to the limited purpose account. Throttling is not applied to a range of IP addresses associated with the computing device. An identity verifier receives a plurality of usernames from a limited purpose account user. The identity verifier provides a plurality of valid limited purpose usernames to the limited purpose account user. The identity verifier maintains a plurality of domain names identifying limited purpose usernames Described herein is a method of establishing limited purpose account identifiers in which an identity verifier comprising a processor and a memory attached to the processor establishes limited purpose account identifiers, and sends the limited purpose account identifiers to a user or organization. The limited purpose account identifier is a username. The limited purpose account identifier includes a domain name associated with a limited purpose account. In response to determining that a user or organization establishes the limited purpose account identifiers, sending the limited purpose account identifiers comprising a domain name to the identity verifier. In response to determining that a user or organization establishes the limited purpose account identifier, sending a username to the identity verifier.

Example of a Suitable Computing Environment

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above.

Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and nonvolatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computing device comprising:
   a hardware processor; and
   a hardware computer-readable storage medium storing executable instructions which, when executed by the hardware processor, cause the hardware processor to implement an operating system,
   wherein the operating system provides first run logic that runs when the computing device is turned on for the first time, and
   wherein the operating system is configured to:
      send a request for connection to a cloud-based identity verifier, the request comprising a particular username associated with a particular account;
      receive, from the cloud-based identity verifier, a notification indicating that the particular account is a limited purpose account; and
      responsive to receiving the notification from the cloud-based identity verifier indicating that the particular account is a limited purpose account, configure the computing device so that the first run logic of the operating system executes the next time that the computing device is turned on.

2. The computing device of claim 1, wherein the operating system is configured to:
   receive the particular username from a user of the computing device.

3. The computing device of claim 2, wherein the user is associated with a manufacturer of the computing device.

4. The computing device of claim 1, wherein the particular username includes a limited purpose domain name of a limited purpose domain maintained by the cloud-based identify verifier.

5. The computing device of claim 1, wherein the operating system is configured to:
   automatically shut down after a specified period of time based at least on the notification that the particular account is a limited purpose account.

6. The computing device of claim 1, wherein the operating system is configured to:
   maintain a separate file in which changes to initial settings of the operating system are stored while the limited purpose account is active.

7. The computing device of claim 6, wherein the operating system is configured to:
   delete the separate file upon shutdown of the computing device.

8. The computing device of claim 1, wherein the operating system is configured to:
   restrict user functionality responsive to receiving the notification from the cloud-based identity verifier indicating that the particular account is a limited purpose account.

9. The computing device of claim 8, wherein the restricted user functionality prevents downloading or uploading files and sending email.

10. The computing device of claim 8, wherein the restricted user functionality comprises at least one of restricting how many applications that can be used, features of the applications that can be used, or amount of time the applications can be used for.

11. A method comprising:
    receiving an account identifier on a computing device, the computing device having first run logic that runs when the computing device is turned on for the first time;
    sending the account identifier to a remote identity verifier;
    receiving, from the remote identity verifier, an indication that the account identifier is associated with a limited purpose account; and
    responsive to receiving the indication from the remote identity verifier that the account identifier is associated with the limited purpose account, configuring the computing device so that the first run logic executes the next time that the computing device is turned on.

12. The method of claim 11, performed by an operating system of the computing device.

13. The method of claim 12, further comprising:
    after the computing device is turned on again, executing the first run logic to configure the operating system to use a particular language preferred by an end user of the computing device.

14. The method of claim 11, performed upon initial startup of the computing device.

15. The method of claim 11, wherein the account identifier comprises a user name.

16. A hardware computer-readable storage medium storing executable instructions which, when executed by a processor, cause a computing device comprising the processor to perform acts comprising:

after the computing device is turned on for a first time, executing first run logic and sending a request to an identity verifier, the request comprising a particular username associated with a particular account;

receiving, from the identity verifier, a notification indicating the particular account is a limited purpose account; and responsive to receiving the notification from the identity verifier indicating that the particular account is a limited purpose account, configuring the computing device to execute the first run logic again when the computing device is subsequently turned on a second time.

17. The hardware computer-readable storage medium of claim 16, the acts performed by an operating system of the computing device.

18. The hardware computer-readable storage medium of claim 16, wherein the first run logic is configured to copy data or settings to the computing device that were previously used by an end user on another computing device.

19. The hardware computer-readable storage medium of claim 16, the acts further comprising:

restricting functionality for the particular account responsive to receiving the notification.

20. The hardware computer-readable storage medium of claim 16, the acts further comprising:

automatically shutting down the computing device based at least on the notification that the particular account is a limited purpose account.

* * * * *